(12) United States Patent
Arthur et al.

(10) Patent No.: US 7,052,658 B2
(45) Date of Patent: May 30, 2006

(54) HYDROGEN GENERATION CARTRIDGE AND PORTABLE HYDROGEN GENERATOR

(75) Inventors: Alan R. Arthur, Salem, OR (US); Phil Harding, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 10/354,432

(22) Filed: Jan. 29, 2003

(65) Prior Publication Data

US 2004/0146754 A1    Jul. 29, 2004

(51) Int. Cl.
*B01J 8/00* (2006.01)
*H01M 8/06* (2006.01)
*C01B 3/06* (2006.01)

(52) U.S. Cl. .................. 422/198; 422/187; 422/199; 422/240; 429/19; 429/20; 423/648.1; 423/657; 423/658.2

(58) Field of Classification Search .............. 429/17, 429/19, 20, 26; 48/61, 118.5; 423/648.1, 423/657, 658, 658.2, 658.3; 422/129, 187, 422/188, 198, 199, 240
See application file for complete search history.

(56) References Cited

U.S. PATENT DOCUMENTS

| | | | | |
|---|---|---|---|---|
| 3,369,868 | A * | 2/1968 | Kegan | 423/658.2 X |
| 4,157,927 | A | 6/1979 | Chew et al. | |
| 4,468,263 | A | 8/1984 | Artz et al. | |
| 5,346,778 | A * | 9/1994 | Ewan et al. | 429/19 |
| 5,370,845 | A * | 12/1994 | Miller et al. | 422/186.3 |
| 5,817,157 | A * | 10/1998 | Checketts | 48/61 |
| 5,833,934 | A * | 11/1998 | Adlhart | 48/61 X |
| 6,303,009 | B1 | 10/2001 | Bossard | |
| 6,746,496 | B1 * | 6/2004 | Kravitz et al. | 48/118.5 |
| 6,896,709 | B1 * | 5/2005 | Han et al. | 48/118.5 X |

* cited by examiner

Primary Examiner—Stephen J. Kalafut (57) ABSTRACT

A hydrogen generation cartridge preferably includes a munitions casing, a hydrogen producing chemical reactant within the casing, and an outlet for releasing hydrogen produced in the casing. A portable hydrogen generator preferably includes a chamber for receiving a plurality of hydrogen generation cartridges, and control electronics for selectively operating the hydrogen generation cartridges in the chamber. The cartridges individually produce hydrogen under control of the control electronics.

59 Claims, 5 Drawing Sheets

HYDROGEN GENERATION CARTRIDGE AND PORTABLE HYDROGEN GENERATOR

BACKGROUND

Over the past century the demand for energy has grown exponentially. In particular, devices that use electrical energy have proliferated. Energy for such devices has historically been produced by the combustion of hydrocarbons to generate electricity that is then distributed over regional and local power grids. However, the combustion of hydrocarbons produces pollution.

Additionally, many electronic devices are now being made portable and wireless. Such devices require a compact and portable power supply. Batteries are typically used to power such portable electronic devices. However, batteries must either be disposed of when exhausted or recharged. If the battery used is rechargeable, the battery is typically connected to a recharger. The recharger is then plugged into a stationary outlet and takes power from the local power grid to recharge the battery.

With the increased interest in cleaner and more portable energy sources, fuel cells have become more popular and more sophisticated. Research and development on fuel cells has continued to the point where many speculate that fuel cells will soon compete with batteries in supplying electricity for a variety of portable devices both large and small.

Fuel cells utilize an electrochemical reaction between hydrogen and oxygen to produce electricity and heat. Fuel cells can be made similar to batteries, but they can be "recharged" while still providing power. Fuel cells provide a DC (direct current) voltage that may be used to power motors, lights, or any number of electrical appliances. Proton exchange membrane (PEM) fuel cells are particularly practical because of their low operating temperature and adaptability in portable applications.

Unfortunately, hydrogen, a principal reactant used in fuel cells, is historically difficult to store and distribute as compared to conventional fuels. Previous attempts to produce hydrogen from various reactants have faced challenges such as precipitates in the reaction, the volatility of the reaction, low yield, and lack of efficiency. Once produced, hydrogen is typically compressed and stored in tanks. However, such hydrogen tanks have low gravimetric storage efficiency and are under higher pressures.

Consequently, hydrogen is preferably produced at a point near a fuel cell, rather than a centralized production facility. Thus, to be effective, hydrogen generation for fuel cells should preferably be simple, compact, portable, and relatively inexpensive. Furthermore, a hydrogen generator for use with a fuel cell is preferably integrated with the operation of the fuel cell to allow the fuel cell to control the hydrogen generator. This is useful because the demand for hydrogen varies depending on the power output the fuel cell needs to produce.

SUMMARY

In one of many possible embodiments, the present invention provides a hydrogen generation cartridge preferably including a munitions casing, a hydrogen producing chemical reactant within the casing, and an outlet for releasing hydrogen produced in the casing.

In another embodiment, the present invention provides a portable hydrogen generator preferably including a chamber for receiving a plurality of hydrogen generation cartridges, and control electronics for selectively operating the hydrogen generation cartridges in the chamber. The cartridges individually produce hydrogen under control of the control electronics.

BRIEF DESCRIPTION OF THE DRAWINGS

The accompanying drawings illustrate various embodiments of the present invention and are a part of the specification. The illustrated embodiments are examples of the present invention and do not limit the scope of the invention.

Throughout the drawings, identical reference numbers designate similar, but not necessarily identical, elements.

DETAILED DESCRIPTION OF ILLUSTRATED EMBODIMENTS

Fuel cells are typically classified by the type of electrolyte used. The electrolyte is a specially treated dense material that conducts only ions, and does not conduct electrons.

Figure 1:
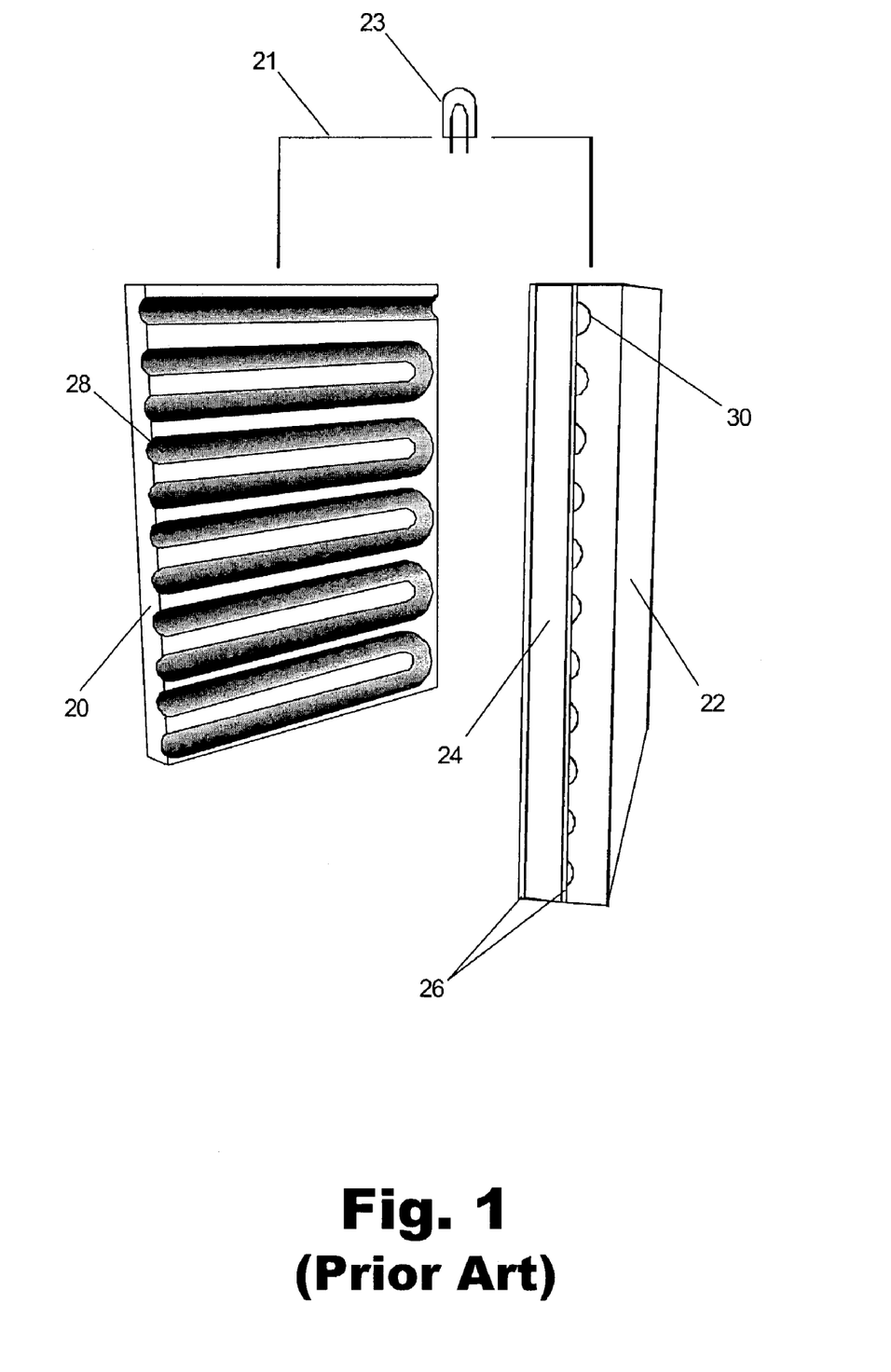
FIG. 1 is an unassembled perspective view of a conventional PEM fuel cell apparatus.

PEM fuel cells are currently believed to be one of the most promising portable fuel cell technologies and use one of the least complex reactions of any fuel cell. Referring to FIG. 1, a PEM fuel cell will typically include four basic elements: an anode (20), a cathode (22), an electrolyte (PEM) (24), and a catalyst (26) arranged on each side of the electrolyte (24).

Anode (20) is the negative post of the fuel cell and conducts electrons that are freed from hydrogen molecules such that the electrons can be used as a current in an external circuit (21). The anode (20) includes channels (28) etched therein to disperse hydrogen gas as evenly as possible over the surface of the catalyst (26). By giving up electrons, the hydrogen molecules become hydrogen ions.

The cathode (22) is the positive post of the fuel cell, and has channels (30) etched therein to evenly distribute oxygen (usually air) to the surface of the catalyst (26). The cathode (22) also conducts the electrons back from the external circuit (21) to the catalyst (26), where the electrons can recombine with the hydrogen ions and oxygen to form water. Under ideal conditions, water is the only by-product of the PEM fuel cell.

The catalyst (26) is typically platinum particles that are thinly coated onto carbon paper or cloth. The catalyst (26) is usually rough and porous so as to increase the surface area of the platinum that can be exposed to the hydrogen or oxygen. However, it would be desirable to further increase catalyst surface area without increasing the dimensions of the catalyst. The catalyst (26) facilitates the reaction of oxygen and hydrogen. In a working fuel cell, the PEM (24) is sandwiched between the anode (20) and the cathode (22).

The operation of the fuel cell can be described generally as follows. Pressurized hydrogen gas ($H_2$) enters the fuel cell on the anode (20) side. When an $H_2$ molecule comes into contact with the platinum catalyst (26), it splits into two H+ ions and two electrons (e−). The electrons are conducted through the anode (20), where they make their way through the external circuit (21) that may be providing power to do useful work (such as turning a motor or lighting a bulb (23)) and return to the cathode side (22) of the fuel cell.

Meanwhile, on the cathode (22) side of the fuel cell, oxygen gas ($O_2$) is being forced through the catalyst (26). In some PEM fuel cell systems, the $O_2$ source may be air. As $O_2$ is forced through the catalyst (26), it forms two oxygen atoms, each having a strong negative charge. This negative charge attracts the two H+ ions through the PEM (24), where they combine with an oxygen atom and two of the electrons from the external circuit to form a water molecule ($H_2O$).

The PEM fuel cell reaction just described produces only about 0.7 volts; therefore, to raise the voltage to a more useful level, many separate fuel cells are often combined to form a fuel cell stack.

PEM fuel cells typically operate at fairly low temperatures (about 80° C./176° F.), which allows them to warm up quickly and to be housed in inexpensive containment structures because they do not need any special materials capable of withstanding the high temperatures normally associated with electricity production.

Figure 2:
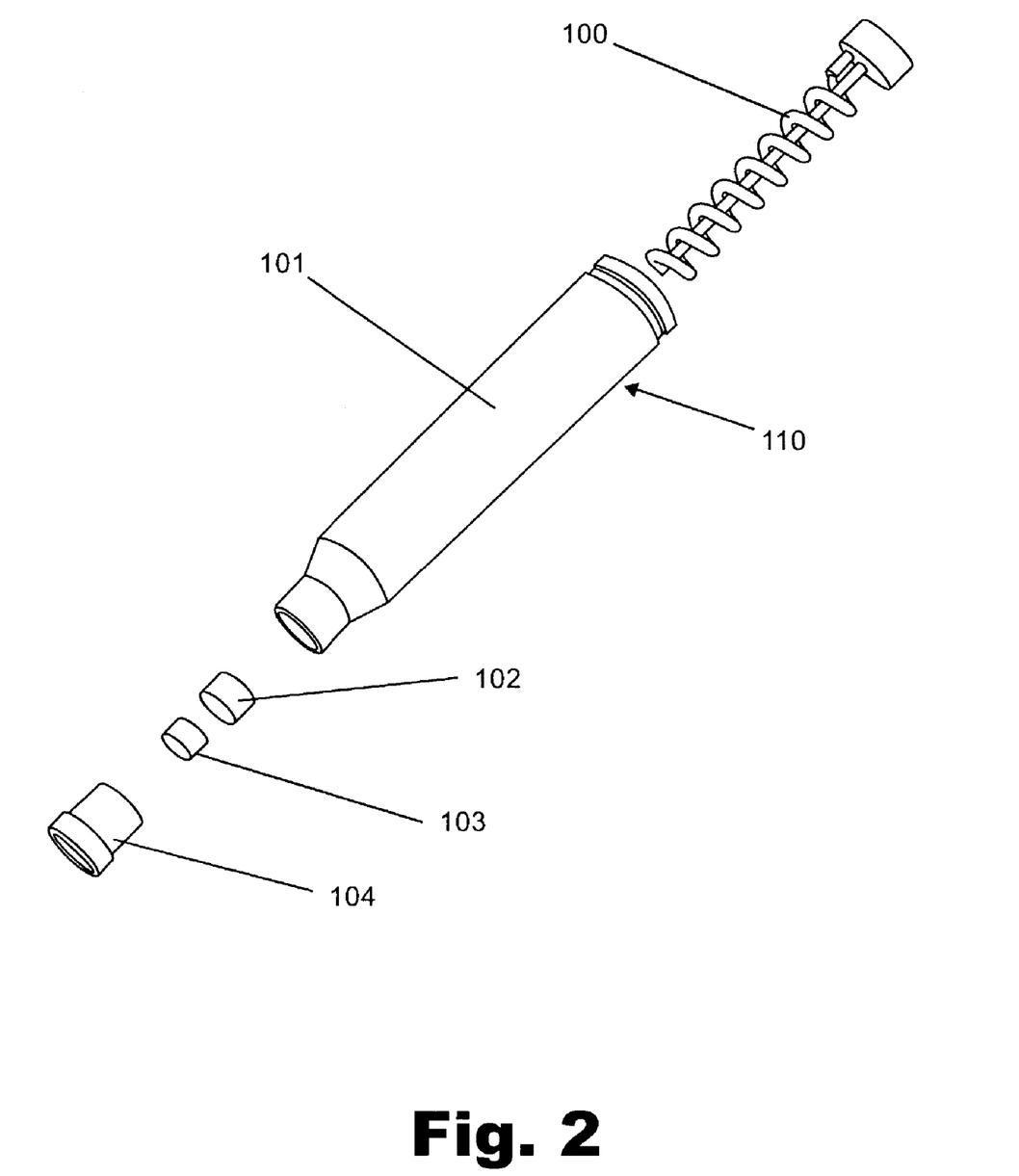
FIG. 2 is an exploded view of a hydrogen generation cartridge according to an embodiment of the present invention.

FIG. 2 is an exploded view of a hydrogen generation cartridge (110). The hydrogen generation cartridge (110) is housed in a casing. Preferably, the casing is a standard munitions casing (101). As used herein and in the appended claims, a munitions casing is defined as a casing or shell that is typically used in making ammunition, i.e., as part of a round or bullet for a firearm.

An example of a munitions casing (101) which can be used to house a hydrogen generation cartridge is a .223 rifle shell casing, the most common type of ammunition used by military personnel. The .223 round is frequently used in the military for purposes of conformity, utility, and availability. Other munitions casings that are very common and practical for housing a hydrogen generation cartridge include 9 mm, 50 BMG, and 45 ACP caliber munitions casings.

In a typical munitions round, the casing (101) is used to house gunpowder grains loaded in a specific amount to provide a specific charge. A primer is located on the bottom of the cartridge for igniting the gunpowder. The casing (101) is sealed on the top or tapered end by the slug or bullet, which is typically made of lead or similar materials.

By producing a hydrogen generation cartridge (110) in a munitions casing (101) there is a whole host of existing facilities and know-how that can be leveraged, thus reducing the overall costs and reducing development and production times for the hydrogen generation cartridge. For example, production facilities, fabrication methods, tooling, machinery and distribution networks for munitions casings can be used for hydrogen generation cartridges. Existing fabrication practices, materials, and machinery used for producing standard munitions can be used to produce casings for hydrogen generation cartridges. Employees familiar with the production of munitions casing can apply their expertise to producing casings for hydrogen generation cartridges. Packaging and distribution channels for munitions casings can be used to package and distribute hydrogen generation cartridges. User experience with munitions casings can help users make use of the hydrogen generation cartridges described herein. Even the munitions loops on vests or belts that have been used to hold and carry ammunition rounds can be used for a supply of hydrogen generation cartridges. Moreover, in nearly all cases, spent munitions casing are easily collected and are reusable. Consequently, the hydrogen generation cartridge (110) of FIG. 2 preferably uses and is built within, a munitions casing (101).

The cartridge (110) further includes a heating element (100). The heating element (100) may be any element that heats the contents of the hydrogen generation cartridge (110). In one embodiment, the heating element (100) is a chemically activated compound or heating core. In another embodiment, the heating element is a mechanically initiated primer. In another embodiment, the heating element (100) is an electrical resistive element. With a resistive element, current is passed through the resistive element (100) which then generates heat. The heating allowing the contents of the casing (101) to reach a "light-off" temperature sufficient to initiate a desired chemical reaction for producing hydrogen.

The casing (101) preferably encases any one of a number of thermally-activated, hydrogen-producing compounds, for example, amine boranes. As used herein and in the appended claims, any chemical compound used to produce hydrogen within the hydrogen generation cartridge (110) will be referred to as a reactant.

The reactants are commonly compacted into pellets to increase hydrogen output per volume. This allows a large amount of hydrogen to be produced from a single highly compacted pellet. The pellets (not shown) are then placed in the cartridge housing (101). In one embodiment, the pellet is formed around the heating element (100) to improve start-up performance and overall efficiency.

The top or tapered end of the munitions casing (101) is sealed by a filter (103) allowing only hydrogen gas to pass. The filter (103) screens out any particulate or residue from the chemical reaction. Filters that can be used in this and other embodiments are described, for example, in U.S. Pat. No. 4,468,263. The filter (103) is preferably secured to the casing (101) by a filter retainer (102).

In many cases, the reactants may react more efficiently at a specific pressure. A pressure release valve (104) is secured over the filter (103) to maintain the desired pressure. A high pressure check valve or similar valve mechanism may be substituted for the pressure release valve (104). The pressure release valve (104) releases the hydrogen being produced once the chemical reaction has reached the optimal pressure. As the chemical reaction continues, the pressure valve (104) sustains the optimal pressure in the cartridge (110) and releases the excess hydrogen for use. In some embodiments, the pressure within the cartridge may reach 3000 psi.

Assuming that the standard .223 cartridge has an available volume of 1.92 cc, the average density of an amine borane based hydrogen producing compound as described in U.S. Pat. No. 4,157,927 is calculated to be:

$$90\%\left(\frac{1.2\text{ g}}{\text{cc}}\right) + 10\%\left[74\%\left(\frac{5.2\text{ g}}{\text{cc}}\right) + 26\%\left(\frac{1.07\text{ g}}{\text{cc}}\right)\right] = 1.49\frac{\text{g}}{\text{cc}}.$$

Therefore, the available reactant mass is approximately 2.9 g of reactant. The per unit weight yield of hydrogen from the amine borane based compound is 17.65%. Approximately 0.51 g of $H_2$ may then be produced from the 2.9 g of available reactant. The volume (V) of $H_2$ produced per cartridge can easily be calculated for standard temperature and pressure (STP):

$$V = (0.51 \text{ g})\left(\frac{.08205 \ l \text{ atm}}{\text{g mole K}}\right)\left(\frac{\text{g mole}}{2.018 \text{ g}}\right)\left(\frac{298\text{K}}{1 \text{ atm}}\right) = 6.2 \ l \text{ of } H_2.$$

The specific energy content of the fuel would be roughly $$\text{Specific Energy} = \left(33{,}300 \frac{W-h}{\text{kg}}\right)(.1765) = 5877 \frac{W-h}{\text{kg}},$$

where 33,300 W-h/kg is the specific energy of pure hydrogen.

Assuming a 20 W load at 10% parasitic power waste and 60% fuel cell efficiency, the fuel cell operating time (t) can be calculated as $$t = \left(\frac{2.9 \text{ g}}{1000 \frac{\text{g}}{\text{kg}}}\right)\left(\frac{5877 \frac{W-h}{\text{kg}}}{20W}\right)\left(\frac{60 \text{ min}}{h}\right) * 0.9 * 0.6 = 28 \text{ min or}$$

approximately three hours for a system that can support seven hydrogen cartridges.

With these assumed efficiencies, the fuel has an effective specific energy of $$5877 \frac{W-h}{\text{kg}} * 0.9 * 0.6 = 3174 \frac{W-h}{\text{kg}}.$$

In this case even, if the system overhead resulted in a weight allocation of 2:1 system to fuel, the remaining energy content would still be roughly $$1058 \frac{W-h}{kg}.$$

By way of comparison, estimated values for maximum specific energy for lithium ion batteries are approximately $$172 \frac{W-h}{\text{kg}}.$$

Figure 3:
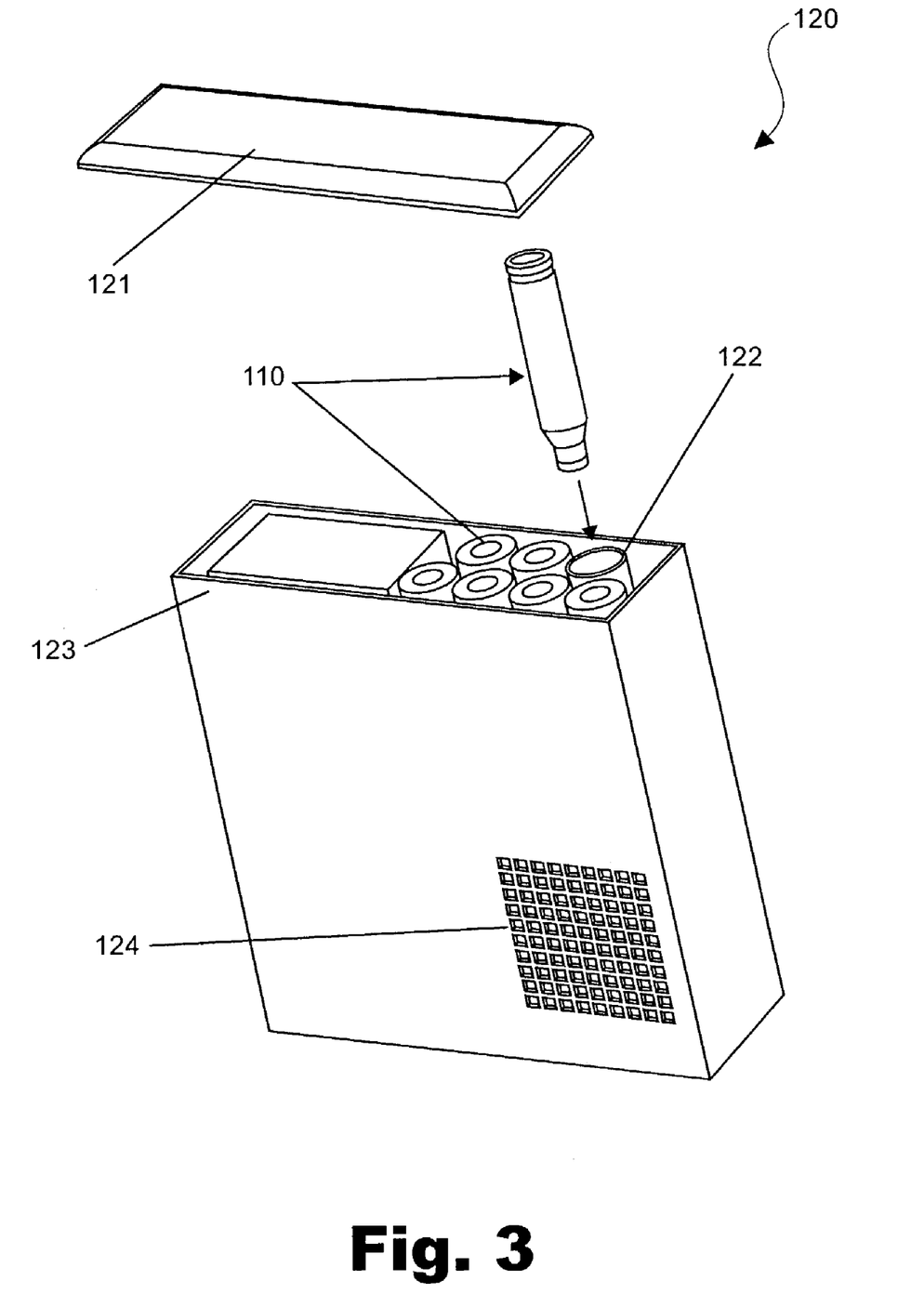
FIG. 3 is a perspective view of a hydrogen cartridge powered fuel cell system according to an embodiment of the present invention.

FIG. 3 is a perspective view of a hydrogen cartridge powered fuel cell system (120). In this system, multiple hydrogen cartridges (110), as described above, may be loaded into the system to produce hydrogen for an embedded fuel cell. The availability of multiple hydrogen cartridges (110) allows the user to select how much hydrogen and or energy will be produced by the system.

The hydrogen cartridge powered fuel cell system (120) includes cartridge receptacles (122) for receiving the hydrogen cartridges (110). The cartridge receptacle (122) is defined as any chamber, fastener, holder, or other means for receiving the hydrogen cartridges (110) and securing them for use, hereinafter referred to as the chamber (122). The illustrated embodiment has a chamber (122) that holds seven hydrogen cartridges (110). Additionally, the chamber (122) may include contacts for activating the heating elements of the hydrogen cartridges (110).

The hydrogen cartridge powered fuel cell system (120) is enclosed by an outer shell (123). The outer shell (123) assures safe operation of the system (120) at all times and separates the user from the chemical reactants used in the hydrogen generation process. The outer shell (123) may be any material that is able to withstand the operational pressures and temperatures associated with normal use of the PEM fuel cell. In one embodiment, the outer shell (123) is a plastic. In another embodiment, the outer shell (123) is metal such as aluminum. The outer shell (123) is durable enough to survive the rigors of outdoor use.

The top of the hydrogen cartridge powered fuel cell system (120) is sealed by a lid (121). The lid (121) is preferably removable or hinged in order to provide easy access for inserting and removing hydrogen cartridges (110) as needed. Preferably, the lid (121) seals tightly against the walls of the outer shell (123) providing an effective pressure seal. The system may allow hydrogen cartridges (110) to be replaced without significantly disrupting the operation of the system.

Figure 4:
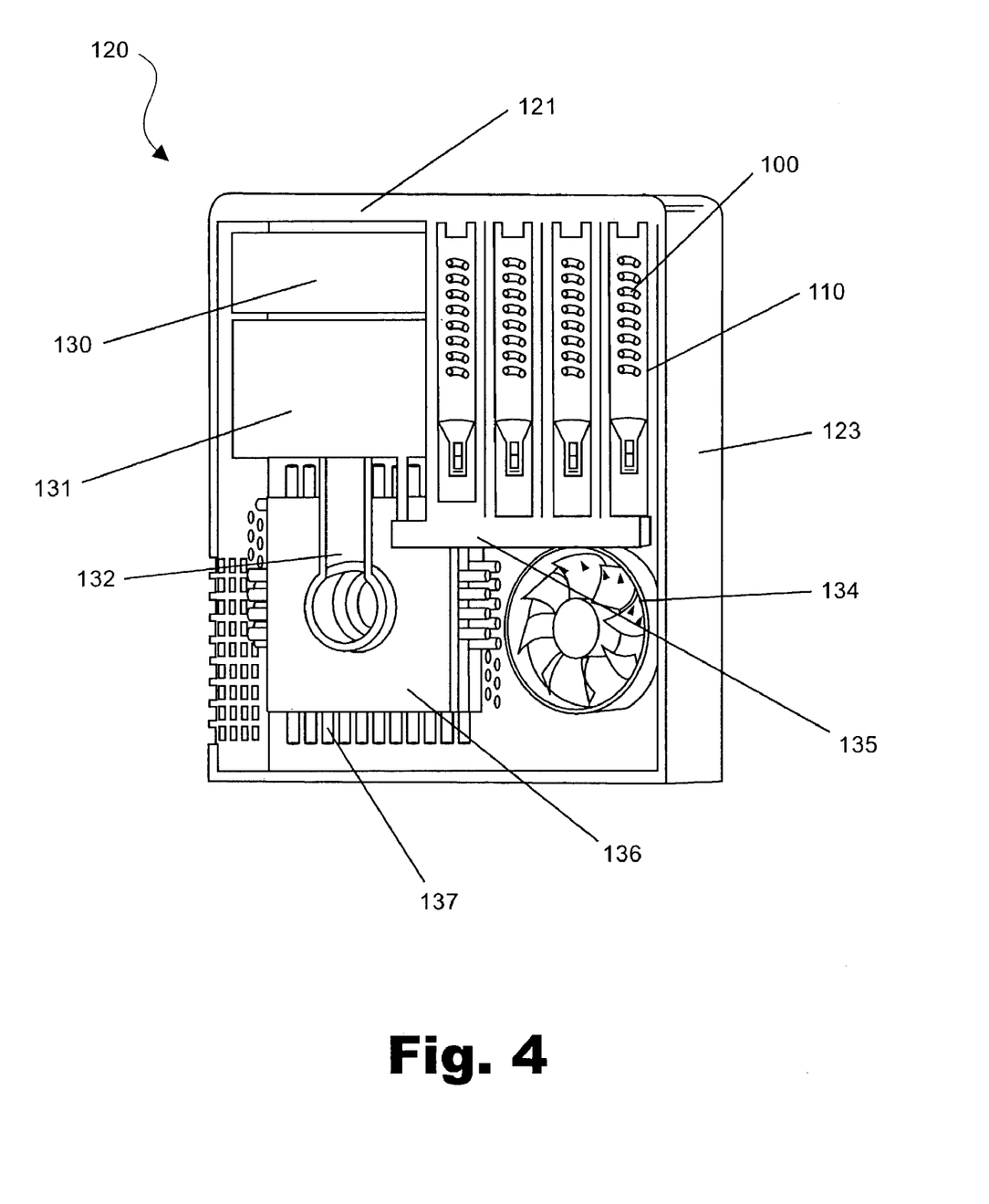
FIG. 4 is a cut-away view of a hydrogen cartridge powered fuel cell system according to an embodiment of the present invention.

The outer shell (123) is preferably equipped with a fan inlet (124) for allowing air to be input in to the fuel cell. The fan inlet (124) may be a perforated or gridded section of the outer shell (123). As shown in FIG. 4, a fan (134) may be positioned behind the fan inlet (124) for pulling air into the system.

Once produced by the system illustrated in FIG. 3, the hydrogen may then be fed to a fuel cell, preferably incorporated into the system of FIG. 3, or transferred to a different device for any number of uses. Additional embodiments may include an output port for transferring hydrogen to different devices.

FIG. 4 is a cut-away view of the hydrogen cartridge powered fuel cell system (120) of FIG. 3. A redundant description of system components discussed above in connection with FIG. 3 will be omitted in describing FIG. 4. The system (120) includes various control electronics (130) to regulate the operation of the system (120), including providing safety and efficiency measures. The control electronics (130) control the production of hydrogen from the cartridges (110) and regulate hydrogen use within a fuel cell (136), preferably a PEM fuel cell.

The control electronics (130) may include an internal battery for driving the heating elements of the hydrogen cartridges temporarily until the fuel cell (136) begins to produce power. Alternatively, the fuel cell (136) may have a mechanically initiated primer to supply a short current or small chemical reaction to initiate the amine boride reaction. The system (120) preferably includes a port for transferring power generated in the fuel cell (136) to other devices.

Additionally, the control electronics (130) preferably monitor and control when each hydrogen cartridge (110) is activated. The lid (121) may contain various contacts for allowing a current to pass to the resistive element of a selected hydrogen cartridge (110) under control of the control electronics (130). In some embodiments, the system (120) allows multiple cartridges (110) to be activated simultaneously for increased hydrogen production.

In some embodiments, the control electronics may include a user interface for controlling and monitoring the operational elements of the system. The user interface may allow the user to select how many cartridges to activate, timing of ignition, output energy level, and whether or not to transfer the produced hydrogen to an external device. The user interface may also provide information about the operation of the system and available resources.

Once a hydrogen cartridge (110) begins to release hydrogen the gas is channeled through a manifold (135) to an accumulator (131). The manifold (135) transfers hydrogen from the point the hydrogen is expelled from the cartridge (110) to the accumulator (131). The manifold (135) may allow multiple cartridges (110) to release hydrogen to the accumulator (131) at one time.

The accumulator (131) is a storage area for the hydrogen gas. The accumulator (131) allows the hydrogen to be stored and then metered to the fuel cell (136) as consumption dictates. Pressures from the reaction may be up to 3000 psi as compared to the average resulting pressure of 51,000 psi resulting from firing a .223 Remington rifle cartridge. As the fuel cell (136) functions, hydrogen is channeled through an accumulator manifold (132) for consumption in the fuel cell (136).

The hydrogen cartridge powered fuel cell system (120) preferable includes a heat exchanger (137). The heat exchanger (137) allows waste heat to be released from the fuel cell (136) to maintain optimal temperatures within the system. In some embodiments, the heat exchanger (137) may be equipped with various pins for maximizing surface area and cooling potential. The heat and by-products expelled from the fuel cell (136) are preferably cooled by the heat exchanger (137) before being expelled to the exterior of the system.

Figure 5:
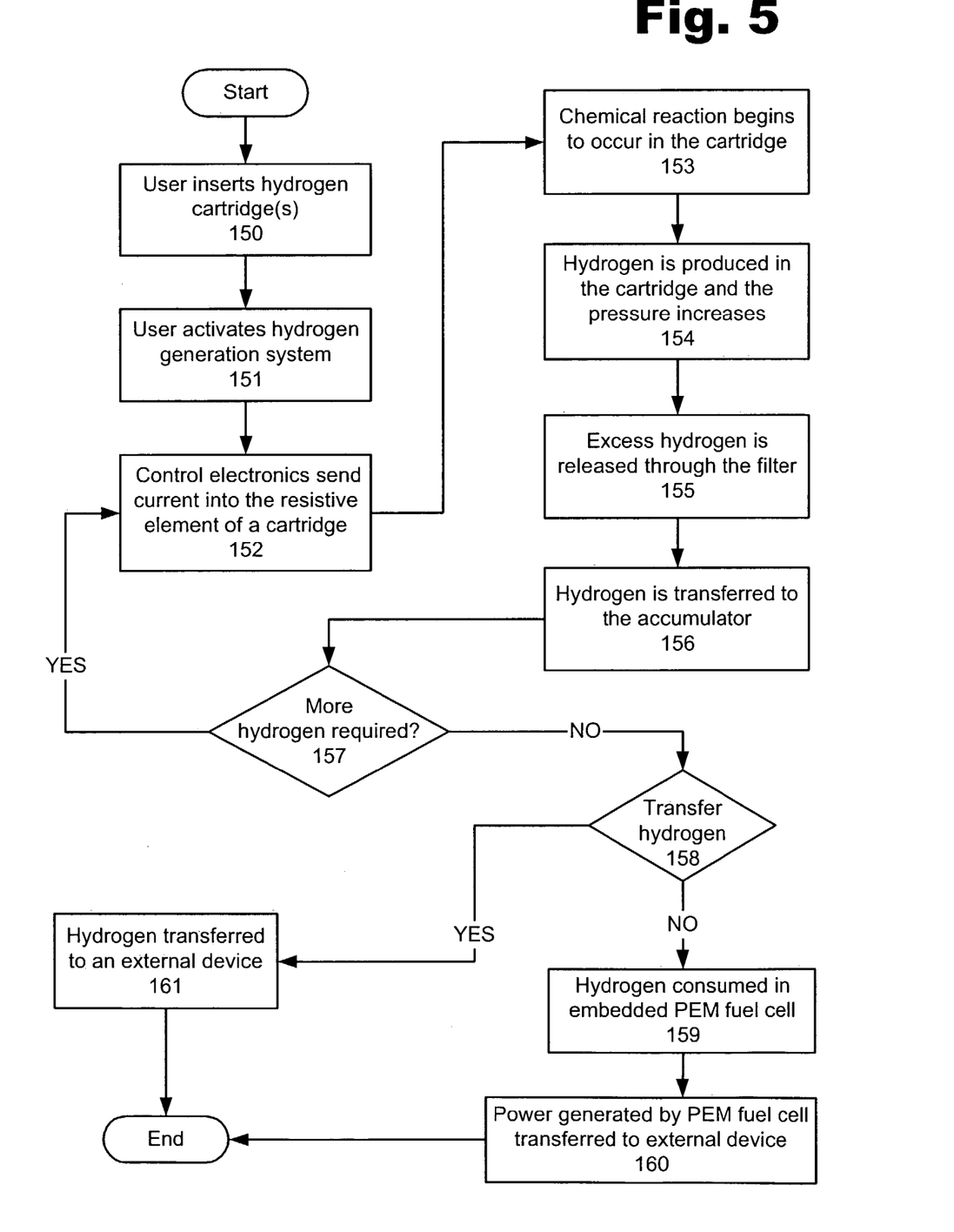
FIG. 5 is a flowchart illustrating a method of operating the system illustrated in FIG. 4 according to an embodiment of the present invention.

FIG. 5 is a flowchart illustrating a method of operating the system illustrated in FIG. 4. The process may begin as a user inserts a single or multiple hydrogen cartridges into the system (150). The user subsequently shuts the lid sealing the system so that the user can then select when to activate the hydrogen generation system (151).

The system is activated when a cartridge is initiated. Cartridge initiation occurs when the control electronics activate the heating element, e.g., send current into a resistive element (152), thereby heating the cartridge and corresponding chemical reactants. As the temperature increases, the chemical reaction begins to occur in the cartridge (153). As the reaction further develops hydrogen is produced from the reactants in the cartridge and the pressure begins to increase (154). The pressure builds until the excess hydrogen is released through the filter (155). The chemical reaction continues within the cartridge at this point as excess hydrogen continues to be released through the filter (155). The hydrogen is then transferred to the accumulator (156) where it can be temporarily stored for use.

As the active hydrogen cartridge is expended, the user may be prompted by the control electronics to select whether more hydrogen is required (157). Additionally, the default mechanism will be to automatically move to the next hydrogen cartridge once the process has begun. If the user decides that more hydrogen is required (157) the control electronics activate the heating element of a different cartridge (152). The process then continues as previously described.

If however, it is determined that more hydrogen is not required (157), the user may select to transfer the hydrogen (158) stored in the accumulator to a separate device. If the user selects to transfer the hydrogen (158), the hydrogen is transferred to an external device (161) from the accumulator. By default, or as specified by the user, the hydrogen produced is not transferred to an external device (158). Rather, the hydrogen is transferred from the accumulator to the system's fuel cell. The hydrogen is then consumed in the power generation process of the embedded PEM fuel cell (159). The power generated by the fuel cell is then transferred to an external device as needed (160).

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A hydrogen generation cartridge comprising:
   a bullet casing;
   a hydrogen producing chemical reactant within said casing; and
   an outlet for releasing hydrogen produced in said casing.

2. The cartridge of claim 1, wherein said outlet comprises a pressure release valve.

3. The cartridge of claim 1, further comprising a filter disposed in said outlet for filtering hydrogen produced from said hydrogen producing chemical reactant.

4. The cartridge of claim 3, further comprising a filter retainer for securing said filter.

5. A hydrogen generation cartridge comprising:
   a munitions casing;
   a hydrogen producing chemical reactant within said casing and
   an outlet for releasing hydrogen produced in said casing;
   wherein said hydrogen producing chemical reactant is an amine borane.

6. A hydrogen generation cartridge comprising:
   a munitions casing;
   a hydrogen producing chemical reactant within said casing;
   an outlet for releasing hydrogen produced in said casing; and
   a heating element disposed in said casing.

7. The cartridge of claim 6, wherein said heating element is a resistive element.

8. The cartridge of claim 6, wherein said heating element is a mechanical igniter.

9. The cartridge of claim 6, wherein said heating element is a chemical heating core.

10. The cartridge of claim 6, wherein said hydrogen producing chemical reactant is compacted around said heating element.

11. The cartridge of claim 1, wherein said hydrogen producing chemical reactant is formed into one or more pellets.

12. The cartridge of claim 1, wherein said casing is any of a .223, 50 BMG, 45 ACP, or 9 mm casing.

13. The cartridge of claim 1, wherein said cartridge is reusable.

14. A portable hydrogen generator comprising:
    a chamber for receiving a plurality of hydrogen generation cartridges, each said cartridge comprising a munitions casing; and
    control electronics for selectively operating said hydrogen generation cartridges in said chamber, wherein said cartridges individually produce hydrogen under control of said control electronics.

15. The generator of claim 14, further comprising a manifold for collecting and transferring hydrogen produced from said hydrogen generation cartridges.

16. The generator of claim 15, further comprising an accumulator connected to said manifold for storing a volume of hydrogen produced by said cartridges and collected by said manifold.

17. The generator of claim 14, further comprising a lid for said chamber that comprises electrical connections between said control electronics and said plurality of cartridges.

18. The generator of claim 14, wherein said control electronics further comprise a user interface for allowing a user to control said portable hydrogen generator.

19. The generator of claim 14, further comprising a fan for cooling an interior of said generator.

20. The generator of claim 14, further comprising an integrated fuel cell for producing power from hydrogen produced by said cartridges.

21. The generator of claim 20, further comprising a heat exchanger for dissipating heat produced by said fuel cell.

22. The generator of claim 14, wherein said control electronics are configured to activate multiple hydrogen generation cartridges simultaneously for increased hydrogen production.

23. A portable hydrogen generator comprising:
a chamber for receiving a plurality of hydrogen generation cartridges; and
control electronics for selectively operating said hydrogen generation cartridges in said chamber,
wherein said cartridges individually produce hydrogen under control of said control electronics; and
wherein each of said hydrogen generation cartridges comprises:
a munitions casing;
a hydrogen producing chemical reactant within said casing; and
an outlet for releasing hydrogen produced in said casing.

24. The generator of claim 23, wherein said outlet comprises a pressure release valve.

25. The generator of claim 23, further comprising a filter disposed in said outlet for filtering hydrogen produced from said hydrogen producing chemical reactant.

26. The generator of claim 25, further comprising a filter retainer for securing said filter.

27. The generator of claim 23, wherein said hydrogen producing chemical reactant is an amine borane.

28. The generator of claim 23, further comprising a heating element disposed in said casing.

29. The generator of claim 28, wherein said heating element is a resistive element.

30. The generator of claim 28, wherein said heating element is a mechanical igniter.

31. The generator of claim 28, wherein said heating element is a chemical heating core.

32. The generator of claim 28, wherein said hydrogen producing chemical reactant is compacted around said heating element.

33. The generator of claim 28, wherein said control electronics selectively drive said heating elements of said cartridges.

34. The generator of claim 33, wherein said control electronics comprise a battery for selectively powering said heating elements of said cartridges.

35. The generator of claim 23, wherein said hydrogen producing chemical reactant is formed into one or more pellets.

36. The generator of claim 23, wherein said munitions casing is any of a .223, 50 BMG, 45 ACP, or 9 mm casing.

37. The generator of claim 23, wherein said control electronics are configured to activate multiple hydrogen generation cartridges simultaneously for increased hydrogen production.

38. A method of making a hydrogen generation cartridge comprising planing a hydrogen producing chemical reactant in a bullet casing having an outlet for releasing hydrogen produced in said casing.

39. The method of claim 38, further comprising providing a pressure release valve in said outlet.

40. The method of claim 38, further comprising providing a filter disposed in said outlet for filtering hydrogen produced from said hydrogen producing chemical reactant.

41. A method of making a hydrogen generation cartridge comprising placing a hydrogen producing chemical reactant in a munitions casing having an outlet for releasing hydrogen produced in said casing, wherein said hydrogen producing chemical reactant is an amino borane.

42. A method of making a hydrogen generation cartridge comprising placing a hydrogen producing chemical reactant in a munitions casing having an outlet for releasing hydrogen produced in said casing, said method further comprising providing a heating element in said casing.

43. The method of claim 42, further comprising compacting said hydrogen producing chemical reactant around said heating element.

44. The method of claim 38, further comprising forming said hydrogen producing chemical reactant into one or more pellets.

45. The method of claim 38, wherein said casing is any of a .223, 50 BMG, 45 ACP, or 9 mm casing.

46. A method of generating hydrogen comprising conducting a hydrogen producing reaction with a hydrogen producing chemical reactant housed in a bullet casing having an outlet for releasing hydrogen produced in said casing.

47. The method of claim 46, further comprising filtering hydrogen produced from said hydrogen producing chemical reactant.

48. A method of generating hydrogen comprising conducting a hydrogen producing reaction with a hydrogen producing chemical reactant housed in a munitions casing having an outlet for releasing hydrogen produced in said casing, wherein said hydrogen producing chemical reactant is an amine borane.

49. A method of generating hydrogen comprising conducting a hydrogen producing reaction with a hydrogen producing chemical reactant housed in a munitions casing having an outlet for releasing hydrogen produced in said casing, said method further comprising beating said reactant to induce said reaction.

50. The method of claim 49, wherein said heating is performed selectively by control electronics controlling a plurality of heating devices disposed in a plurality of munitions casings.

51. The method of claim 46, further comprising forming said hydrogen producing chemical reactant into one or more pellets.

52. The method of claim 46, wherein said casing is any of a .223, 50 BMG, 45 ACP, or 9 mm casing.

53. The method of claim 50, further comprising collecting hydrogen produced in said munitions casings for use by a fuel cell.

54. A system of generating hydrogen comprising:
   means for containing a hydrogen-bearing reaction;
   a hydrogen producing chemical reactant housed in said means for containing said reaction;
   wherein said means for containing said reaction contains said reaction up to a pressure of about 3000 psi.

55. The system of claim 54, wherein said means for containing comprises a munitions casing having an outlet for releasing hydrogen produced in said casing.

56. The system of claim 54, further comprising means for heating said reactant to initiate said reaction.

57. The system of claim 54, wherein said hydrogen producing chemical reactant is an amine borane.

58. The system of claim 54, further comprising a plurality of said means for containing said reaction.

59. The system of claim 58, further comprising means for selectively controlling said reaction in said plurality of means for containing said reaction.

* * * * *

UNITED STATES PATENT AND TRADEMARK OFFICE
CERTIFICATE OF CORRECTION

PATENT NO. : 7,052,658 B2  
APPLICATION NO. : 10/354432  
DATED : May 30, 2006  
INVENTOR(S) : Alan R. Arthur et al.

Page 1 of 1

It is certified that error appears in the above-identified patent and that said Letters Patent is hereby corrected as shown below:

In column 8, line 30, in Claim 5, before "and" insert -- ; --.

In column 10, line 7, in Claim 38, delete "planing" and insert -- placing --, therefor.

In column 10, line 21, in Claim 41, delete "amino" and insert -- amine --, therefor.

In column 10, line 56, in Claim 49, delete "beating" and insert -- heating --, therefor.

Signed and Sealed this

Twenty-fourth Day of November, 2009

David J. Kappos  
*Director of the United States Patent and Trademark Office*